(12) United States Patent
Tekleab

(10) Patent No.: US 10,775,312 B2
(45) Date of Patent: Sep. 15, 2020

(54) INSTANTANEOUS AND TIME-LAPSE FLUID-FLOW CONTAMINANT INDICATOR

(71) Applicant: Tesfa-Michael Tekleab, Virginia Beach, VA (US)

(72) Inventor: Tesfa-Michael Tekleab, Virginia Beach, VA (US)

(*) Notice: Subject to any disclaimer, the term of this patent is extended or adjusted under 35 U.S.C. 154(b) by 469 days.

(21) Appl. No.: 15/836,395

(22) Filed: Dec. 8, 2017

(65) Prior Publication Data

US 2018/0364176 A1 Dec. 20, 2018

Related U.S. Application Data

(60) Provisional application No. 62/520,268, filed on Jun. 15, 2017.

(51) Int. Cl.

| | | |
|---|---|---|
| *G01N 21/78* | (2006.01) | |
| *B01D 15/08* | (2006.01) | |
| *G01N 31/22* | (2006.01) | |
| *F24F 3/16* | (2006.01) | |
| *B01D 46/00* | (2006.01) | |
| *G01N 21/85* | (2006.01) | |
| *G01N 21/94* | (2006.01) | |

(52) U.S. Cl.
CPC ............ *G01N 21/78* (2013.01); *B01D 15/08* (2013.01); *B01D 46/0086* (2013.01); *F24F 3/1603* (2013.01); *G01N 21/85* (2013.01); *G01N 31/22* (2013.01); *G01N 31/229* (2013.01); *B01D 2201/32* (2013.01); *F24F 2003/1621* (2013.01); *G01N 21/94* (2013.01)

(58) Field of Classification Search
CPC ........ G01N 21/78; G01N 21/85; G01N 31/22; G01N 31/229; G01N 21/94; B01D 15/08; B01D 46/0086; B01D 2201/32; F24F 3/1603; F24F 2003/1621
See application file for complete search history.

(56) References Cited

U.S. PATENT DOCUMENTS

| | | | | |
|---|---|---|---|---|
| 2,567,445 | A * | 9/1951 | Parker | G01N 31/22 436/20 |
| 3,585,963 | A * | 6/1971 | Hiszpanski | G01P 13/008 116/206 |
| 3,620,676 | A * | 11/1971 | Davis | B01L 3/505 422/405 |
| 3,651,695 | A * | 3/1972 | Brown | G01K 11/16 374/147 |
| 4,205,043 | A | 5/1980 | Esch et al. | |

(Continued)

*Primary Examiner* — Nimeshkumar D Patel
*Assistant Examiner* — Tania Courson
(74) *Attorney, Agent, or Firm* — Peter J. Van Bergen

(57) ABSTRACT

A fluid-flow contaminant indicator includes a container having a fluid-flow path having an upstream region and a downstream region. A colorimetric indicator, disposed in the fluid-flow path, has a surface adapted to change color when exposed to a contaminant of interest. The colorimetric indicator has at least one hole passing there through such that the fluid-flow path extends through the hole(s) in the colorimetric indicator. A fluid-impervious mask is adhered to all of the colorimetric indicator's surface except for a region of the surface that is adjacent to the hole(s) in the colorimetric indicator wherein this region is exposed to the upstream region of the fluid-flow path.

19 Claims, 4 Drawing Sheets

(56) References Cited

U.S. PATENT DOCUMENTS

| | | | |
|---|---|---|---|
| 4,409,182 A * | 10/1983 | Macklem | B01L 3/5082 422/408 |
| 4,684,380 A | 8/1987 | Leichnitz | |
| 4,746,338 A | 5/1988 | Williams | |
| 4,876,068 A * | 10/1989 | Castaneda | B01L 3/5082 422/401 |
| 4,933,144 A * | 6/1990 | May | G01N 31/223 422/416 |
| 4,994,238 A * | 2/1991 | Daffern | C12Q 1/54 422/422 |
| 5,059,790 A * | 10/1991 | Klainer | G01N 21/7703 250/227.21 |
| 5,417,204 A * | 5/1995 | Moesle, Jr. | A62B 9/006 128/202.14 |
| 5,505,753 A * | 4/1996 | Heysek | B01D 46/4254 96/416 |
| 5,834,626 A * | 11/1998 | De Castro | G01N 21/783 73/23.3 |
| 6,557,484 B1 * | 5/2003 | Engelman | C12Q 1/54 116/200 |
| 6,701,864 B2 | 3/2004 | Watson, Jr. et al. | |
| 6,979,361 B2 * | 12/2005 | Mihayiov | B01D 35/143 55/DIG. 34 |
| 9,046,502 B2 * | 6/2015 | Chikamune | G01N 21/293 |
| 9,110,028 B2 | 8/2015 | Kirollos et al. | |
| 9,588,023 B2 * | 3/2017 | Coleman | G01N 1/2205 |
| 2006/0286606 A1 * | 12/2006 | Oliver | G01N 1/2214 435/7.1 |
| 2016/0178588 A1 * | 6/2016 | Abbott | C09K 19/0275 116/201 |

\* cited by examiner

INSTANTANEOUS AND TIME-LAPSE FLUID-FLOW CONTAMINANT INDICATOR

Pursuant to 35 U.S.C. § 119, the benefit of priority from provisional application 62/520,268, with a filing date of Jun. 15, 2017, is claimed for this non-provisional application.

FIELD OF THE INVENTION

The invention relates generally to contaminant indicators, and more particularly to a fluid-flow contaminant indicator that can provide both instantaneous and time-lapse indications of one or more contaminants in a fluid.

BACKGROUND OF THE INVENTION

Many public and industrial environments utilize air purification systems to remove contaminants from environmental air. As is known in the art, air purification systems are typically closed-loop systems that incorporate filter(s) to collect and/or absorb a variety of contaminants prior to cycling the air back into an environment. Over time, filters lose their efficacy and must be replaced. For example, filter beds known as sorbent filters are canisters filled with granular sorbents such as activated carbon, zeolites, and silica selected to absorb one or more contaminants of interest.

Once a sorbent filter is saturated with contaminant(s), the sorbent media must be replaced. Colorimetric indicators are used to signal when a sorbent media is saturated. Typically, a colorimetric indicator is placed in a fluid-flow region at or just downstream of a sorbent filter exit/exhaust. Such indicators change color to indicate the presence of a contaminant thereby signaling a sorbent media's loss of efficacy. However, in the presence of high levels of a contaminant and/or interfering substances, conventional colorimetric indicators can be prone to discoloration or bleaching thereby lending themselves susceptible to a false negative interpretation. An interfering substance can be a substance in the system other than the target contaminant. The interfering substance can react or interact with the target contaminant or with the indicator dye to cause discoloration. An interfering substance can also be the target contaminant itself when the target contaminant is present in excess or at high concentration. The above-mentioned false negative result can occur when a colorimetric indicator's color is affected by an interfering substance to the point that an observer can mistakenly interpret the colorimetric indicator as being indicative of a filter's sorbent media that is still effective.

SUMMARY OF THE INVENTION

Accordingly, it is an object of the present invention to provide a fluid-flow contaminant indicator.

Another object of the present invention is to provide a fluid-flow contaminant indicator that can provide true positive contaminant indication even in the presence of high-levels of a contaminant or interfering substances.

Other objects and advantages of the present invention will become more obvious hereinafter in the specification and drawings.

In accordance with the present invention, a fluid-flow contaminant indicator includes a container having a fluid-flow path passing there through. The fluid-flow path has an upstream region and a downstream region. A colorimetric indicator is disposed in the fluid-flow path. The colorimetric indicator has a surface adapted to change color when exposed to a contaminant of interest. The colorimetric indicator has at least one hole passing there through such that the fluid-flow path extends through the hole(s) in the colorimetric indicator. A fluid-impervious mask is adhered to all of the colorimetric indicator's surface except for a region of the surface that is adjacent to the hole(s) in the colorimetric indicator wherein this region is exposed to the upstream region of the fluid-flow path.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
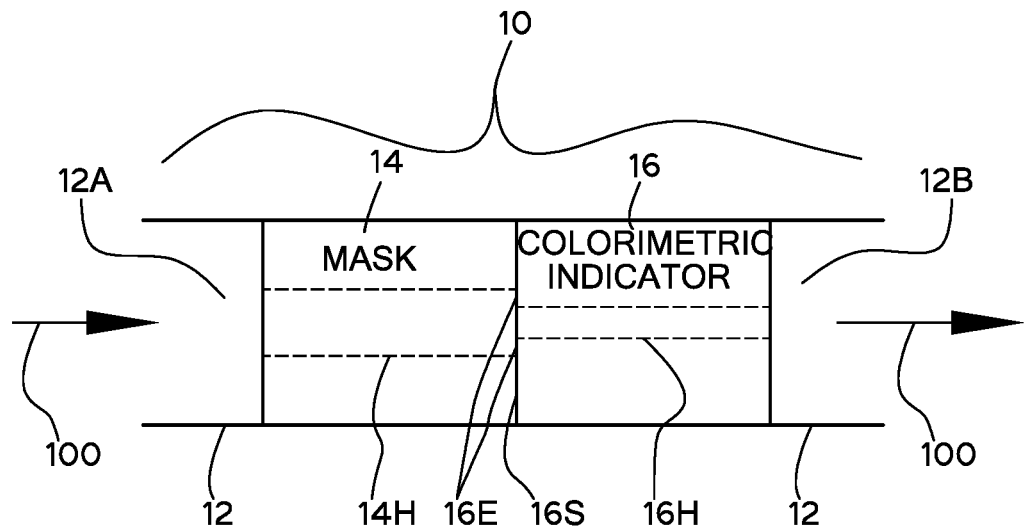
FIG. 1 is a schematic view of an instantaneous and time-lapse fluid-flow contaminant indicator in accordance with an embodiment of the present invention.

Referring now to the drawings and more particularly to FIG. 1, a schematic view of an instantaneous and time-lapse fluid-flow contaminant indicator in accordance with an embodiment of the present invention is shown and is referenced generally by numeral 10. Indicator 10 (as it will be referred to hereinafter) is placed/positioned to receive a fluid-flow 100 that is at or just after the exit/exhaust of a system (not shown) such as an air purification system designed to filter at least one contaminant of interest prior to discharge of fluid-flow 100. Fluid-flow 100 can be forced through indicator 10 or drawn through indicator 10 without departing from the scope of the present invention. Briefly, indicator 10 provides an instantaneous and time-lapse indication of the presence of a contaminant (or contaminants) of interest in fluid-flow 100 as an indication of the efficacy of a filtration system from which fluid-flow 100 was discharged. Fluid-flow 100 flows along a fluid-flow path that extends through indicator 10 and exits same.

Indicator 10 includes a container 12 having a mask 14 and a colorimetric indicator 16 disposed in container 12. The size and shape of container 12, mask 14, and colorimetric indicator 16 are not limitations of the present invention. Mask 14 and colorimetric indicator 16 divide container 12 into an upstream region 12A that receives fluid-flow 100 and a downstream region 12B that discharges fluid-flow 100. For reasons that will be explained further below, container 12 can be made completely or partially from transparent or translucent materials to provide an optical line-of-sight to mask 14.

Mask 14 is a fluid impervious material that is translucent or transparent, e.g., glass, plastic, acrylic, etc. Mask 14 has an opening or hole 14H passing there through. While a single opening/hole 14H is illustrated, additional openings/holes could be provided without departing from the scope of the present invention. It is to be understood that the term "hole 14H" as used hereinafter refers to a single opening or hole as well as multiple openings or holes. Colorimetric indicator 16 has a surface 16S that will experience a specified color change in the presence of a contaminant (or contaminants) of interest. The preparation of surface 16S and materials used for surface 16S will depend on the contaminant (or contaminants) of interest as is well-understood in the art. Accordingly, the specific contaminant-sensitive features of surface 16S are not limitations of the present invention. In terms of the present invention, surface 16S faces upstream region 12A of container 12. Colorimetric indicator 16 has a hole 16H passing there through, although multiple holes similar to hole 16H could be used without departing form the scope of the present invention.

Figures 2A, 2B:
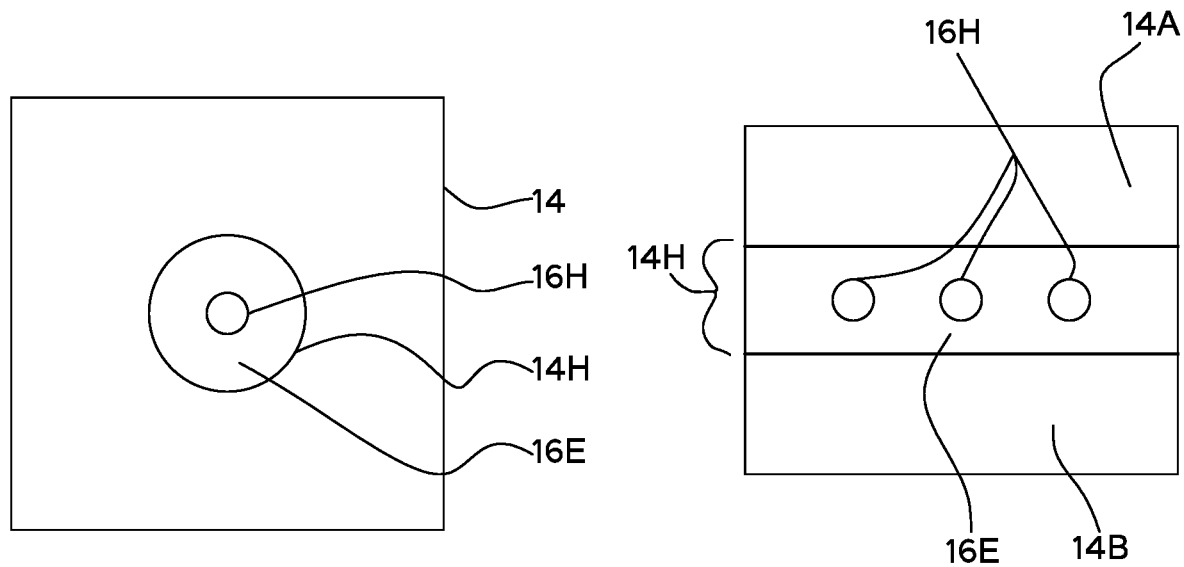
FIG. 2A is a plan view of the indicator's mask with a hole size/shaped to define an exposed surface of a colorimetric indicator that circumscribes the colorimetric indicator's hole in accordance with an embodiment of the present invention.
FIG. 2B is a plan view of the indicator's mask that defines an opening to reveal an exposed surface of a colorimetric indicator that circumscribes the colorimetric indicator's holes in accordance with another embodiment of the present invention.

For purposes of the present invention, mask 14 is adhered to and covers almost all of surface 16S of colorimetric indicator 16. In general, holes 14H and 16H are part of a fluid-flow path through container 12 that extends through upstream region 12A, mask 14/indicator 16, and downstream region 12B. Mask hole 14H is sized positioned relative to indicator hole 16H such that only a portion 16E of surface 16S is exposed to fluid flow 100 as it moves through indicator 10. For example and as illustrated in FIG. 2A, holes 14H and 16H could be coaxially aligned with hole 14H being larger in area then hole 16H such that the resulting exposed portion 16E of surface 16S circumscribes hole 16H where mask 14 is illustrated as it would appear from upstream region 12A of container 12. Note that the size/shape and number of holes 14H/16H can be other than as shown without departing from the scope of the present invention. For example and as illustrated in FIG. 2B, the mask in the present invention can be defined by two spaced-apart pieces 14A and 14B such that an opening 14H is defined there between to thereby reveal an exposed region 16E defined about multiple holes 16H.

Exposed portion 16E of colorimetric indicator 16 provides an instantaneous indication of the presence of contaminant(s) in fluid-flow 100. However, in the event of high-levels of contaminant(s) and/or prolonged exposure thereto or the presence of interfering substances, exposed portion 16E could discolor to the point that it no longer provides a true positive indication of the presence of contaminant(s), i.e., a false negative indication. However, the remainder of surface 16S beyond the confines of exposed portion 16E that is covered by mask 14 will continue to function as a colorimetric indicator for a longer period of time. That is, the masked portion of surface 16S is exposed to contaminants in fluid-flow 100 over a longer period of time since such exposure is due only to absorption of the contaminants from exposed portion 16E rather than direct exposure as is the case with exposed portion 16E. This not only extends the useful life of indicator 10, but also provides a time-lapse indication of the presence of contaminant(s) based on how far the color change extends beyond exposed portion 16E. The color change experienced by exposed portion 16E, as well as the portion of surface 16S beyond the confines of exposed portion 16E, can be viewed from outside of container 12 owing the transparent or translucent portion(s) or entirety of container 12 as mentioned above.

Figure 3:
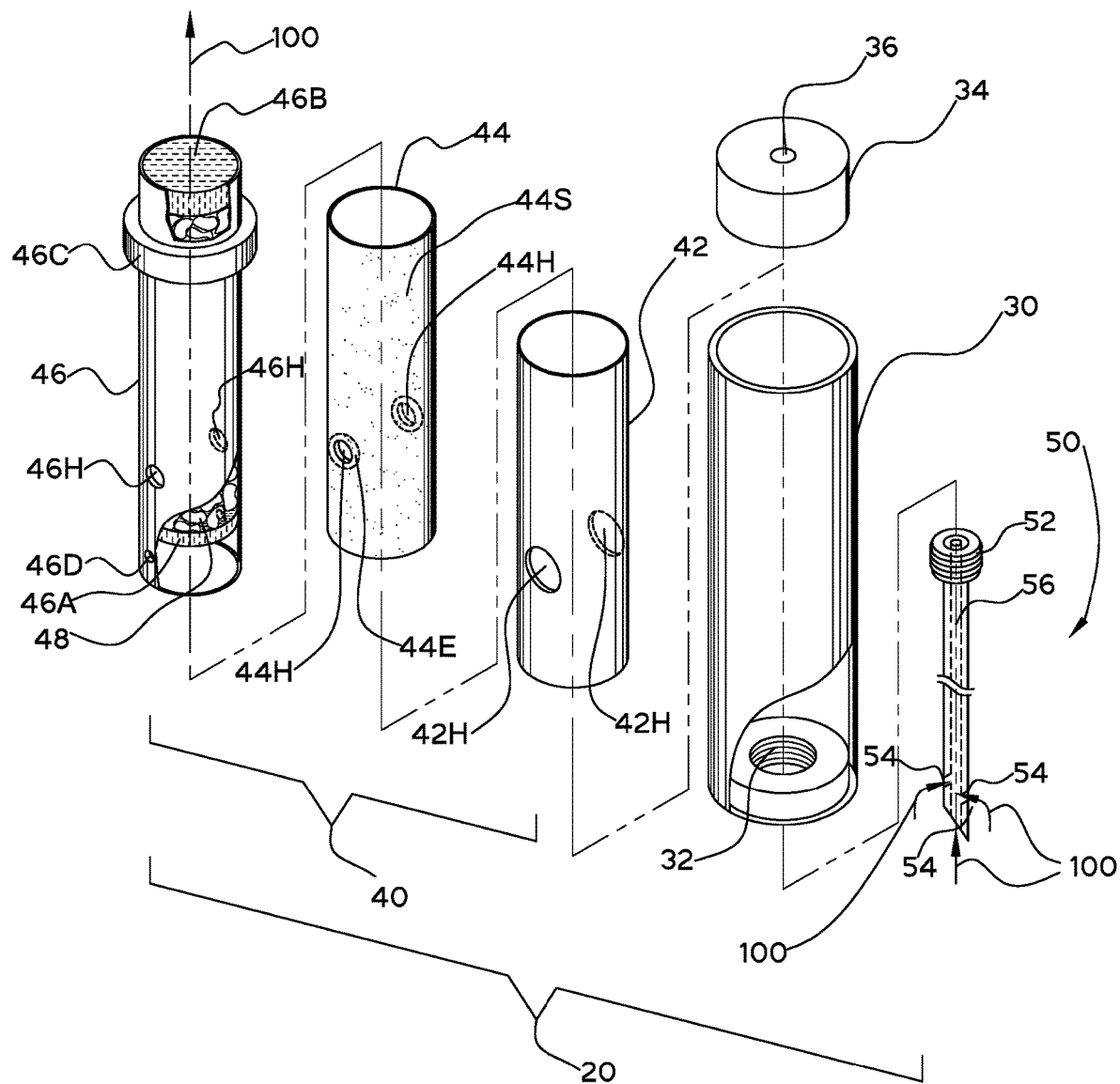
FIG. 3 is an exploded view of a canister-type fluid-flow contaminant indicator in accordance with an embodiment of the present invention.
Figure 5:
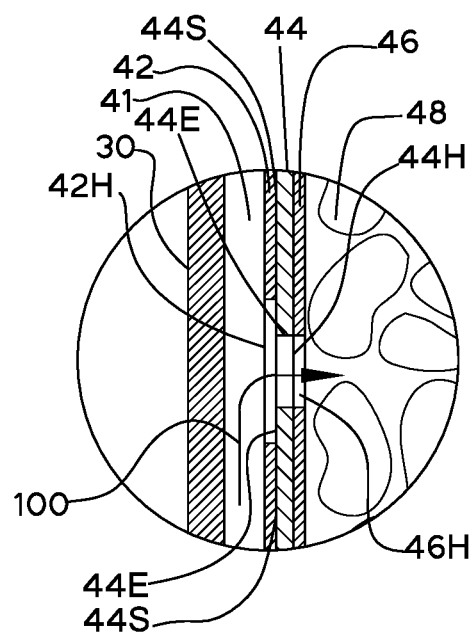
FIG. 5 is an enlarged and isolated view of a fluid-flow path that passes through the contaminant indicator's mask and colorimetric indicator.
Figure 4:
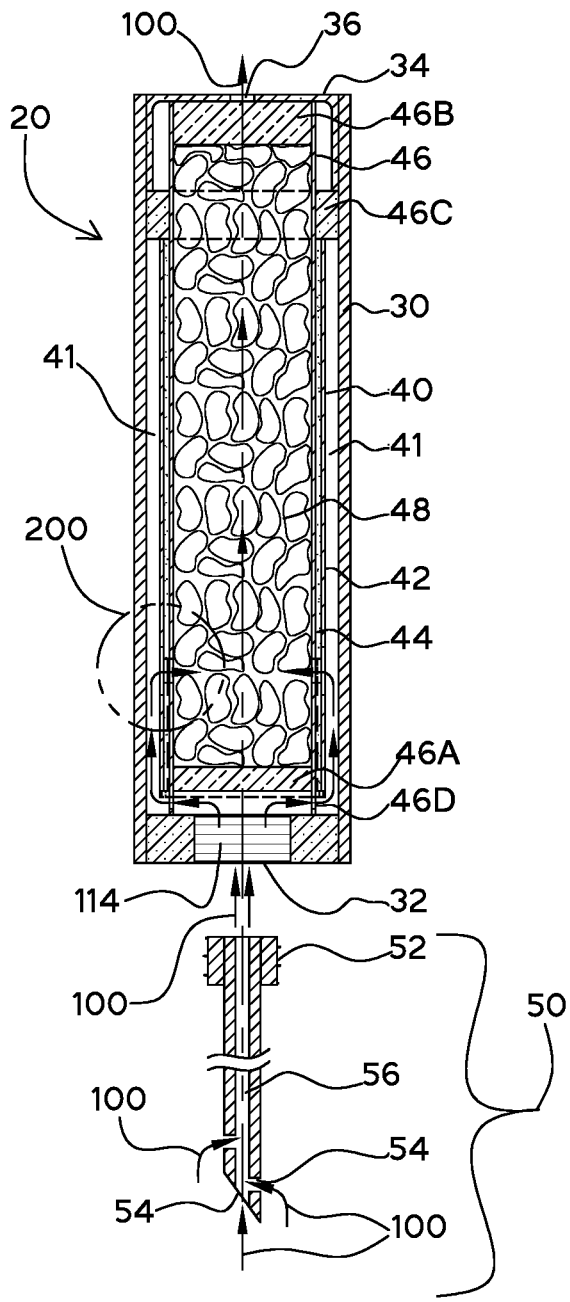
FIG. 4 is a longitudinal cross-sectional view of the fluid-flow contaminant indicator of FIG. 3 in its assembled state.

The present invention can be realized by a variety of embodiments without departing from the scope of the present invention. For example and with simultaneous reference to FIGS. 3-5, the present invention can be a canister-type fluid-flow contaminant indicator referenced generally by numeral 20. An exploded view of indicator 20 with portions thereof being cut away is shown in FIG. 3. A longitudinal cross-section of indicator 20 is illustrated in FIG. 4, and an isolated and enlarged view of the portion of FIG. 4 contained within the dashed-line circle 200 is illustrated in FIG. 5.

Indicator 20 includes a cylindrical housing 30 and a removable colorimetric cartridge 40 fitted in housing 30. An optional sampling probe 50 can be provided for coupling to one end of housing 30. Sampling probe 50 can be constructed for placement in a fluid-flow 100 such that fluid-flow 100 is directed into indicator 20. For example, probe 50 can have one or more inlet ports 54 coupled to an interior channel 56 such that fluid-flow 100 enters ports 54 and flows along channel 56 to end 52. Probe 50 can be threaded at end 52 for engagement with a threaded opening 32 in housing 30 visible in FIG. 3 via the partial cut array portion of housing 30. A fluid-tight seal between end 52 and opening 32 can be formed in a variety of ways without departing from the scope of the present invention. The opposing longitudinal end of housing 30 is sealed by a plug 34 having a flow-through hole 36 for exhausting fluid-flow 100 after it passes through indicator 20. Some or all of housing 30 can be made from a translucent or transparent material (e.g., plastic, glass, acrylic, etc.) that allows one to view the relevant portions of colorimetric cartridge 40 as will be described further below.

Colorimetric cartridge 40 includes an outer transparent or translucent masking cylinder 42, a colorimetric indicator 44 (e.g., a tubular shape, a flat-film taking the shape of masking cylinder 42, etc.), and an optional filter 46 (e.g., a pre-shaped tube, a flexible flat material inserted into the assembly to assume the shape thereof, etc.). Masking cylinder 42 fits within housing 30 such that an annular chamber 41 (FIGS. 4-5) is defined between housing 30 and the outer surface of masking cylinder 42. Masking cylinder 42 has one or more holes 42H (e.g., two in the illustrated embodiment) that function analogously to the above-described mask hole 14H. Masking cylinder 42 is made from a translucent or transparent material. Colorimetric indicator 44 has an outer surface 44S that changes color when exposed to a contaminant (or contaminants) of interest. Indicator 44 has one or more holes 44H (i.e., corresponding in number to the number of holes 42H) where holes 44H function analogously to the above-described hole 16H. Masking cylinder 42 is sealed up against surface 44S in the same way that mask 14 is sealed against surface 16S as described for indicator 10 such that exposed portions 44E are defined about holes 44H with the remainder of surface 44S being masked by masking cylinder 42.

If included, filter 46 provides filtering of fluid-flow 100 passing through indicator 20 in order to absorb any contaminant(s) contained in fluid-flow 100 prior to the discharge thereof from indicator 20. Accordingly, filter 46 can be included in indicator 20 when the contaminant(s) of interest are noxious. For clarity, filter 46 is illustrated with upper and lower portions thereof being partially cut away.

Filter 46 has holes 46H commensurate in number and aligned with holes 44H such that fluid-flow 100 can pass into filter 46 after passing through holes 44H. Filter 46 contains sorbent media 48 between end plugs 46A and 46B. End plug 46B can be porous to allow fluid-flow 100 to exit/exhaust through end plug 46B after passing through sorbent media 48. An o-ring 46C can be used to position and seal filter 46 within housing 30 as best viewed in FIG. 4. The lower portion of filter 46 has flow holes 46D through which fluid-flow 100 passes when entering housing 30 through opening 32.

In operation, fluid-flow 100 is introduced into annular chamber 41 such that it impinges on exposed portions 44E after passing through holes 42H of mask 42. Fluid-flow 100 continues on through holes 44H and 46H for passage into sorbent media 48 and ultimately out of indicator 20. As in the previously-described embodiment, exposed portions 44E react instantaneously to direct contact with contaminant(s) while the masked remainder of surface 44S reacts more slowly since it must absorb contaminant(s) via exposed portions 44E.

Figure 6:
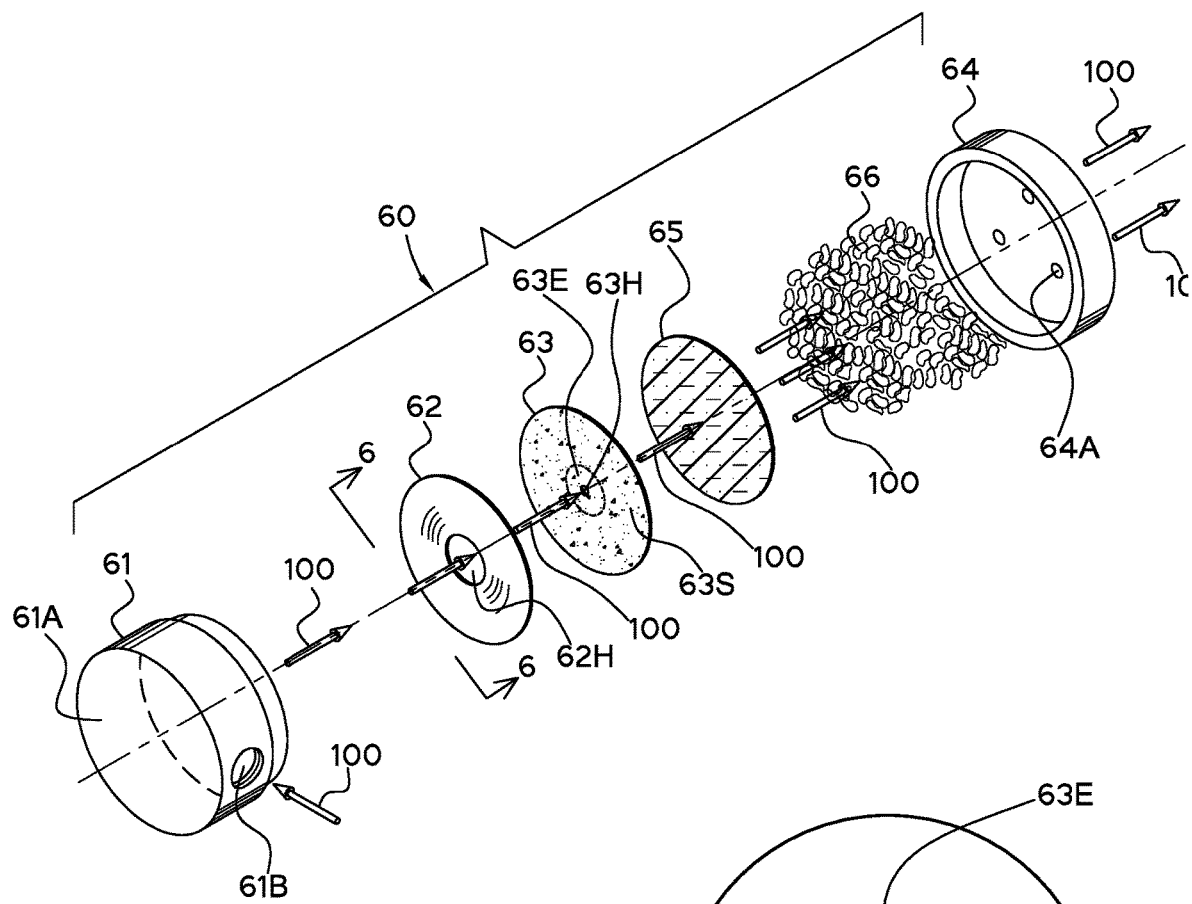
FIG. 6 is an exploded view of an instantaneous and time-lapse fluid-flow contaminant indicator in accordance with another embodiment of the present invention.
Figure 7:
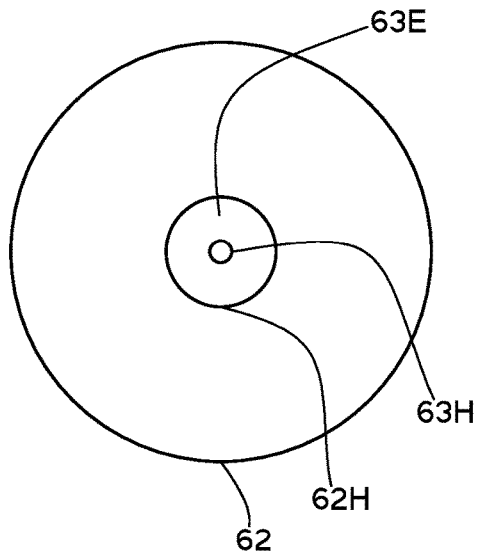
FIG. 7 is a plan view of the mask and the exposed surface of the colorimetric indicator taken along line 6-6 in FIG. 6.

The present invention is not limited to canister-type contaminant indicators. For example, FIG. 6 is an exploded view of an instantaneous and time-lapse fluid-flow contaminant indicator in accordance with another embodiment of the present invention and is referenced generally by numeral 60. An outer housing 61 has a sealed axial end 61A that is translucent or transparent to provide visual access to the reactive portions of indicator 60. A fluid inlet 61B is defined in a sidewall of housing 61 for the admission of fluid-flow 100, e.g., using the probe as described above. Fitted in housing 61 is a transparent mask 62 and colorimetric indicator 63. Mask 62 has a hole 62H passing there through. Colorimetric indicator 63 has a hole 63H passing there through. Similar to the previously-described embodiments, mask 62 is sealed to the surface 63S of colorimetric indicator 63. Holes 62H and 63H are coaxially aligned with the area of hole 62H being larger than hole 63H such that an exposed portion 63E of surface 63S circumscribes hole 63H (FIG. 7) and faces and is exposed to fluid-flow 100 entering indicator 60. One or more spacing elements (not shown) can be placed within indicator 60 to support the entry and movement of fluid-flow 100 into/through indicator 60. Operation of mask 62 and colorimetric indicator 63 is the same as previously-described embodiments. Contaminants in fluid-flow 100 can be monitored by viewing (through axial end 61A) color change experienced by surface 63S where exposed portion 63E provides an instantaneous indicator of the presence of contaminants and the masked portions of surface 63S provide a time-lapse indication of contaminant(s) in fluid-flow 100.

Indicator 60 can include filtering features fitted within an end cap 64 (having one or more exit ports 64A) coupled to housing 61. The filtering features can include a screen 65 and sorbent media 66 selected to absorb contaminants of interest. However, it is to be understood that screen 65 and sorbent media 66 could be omitted from indicator 60 without departing from the scope of the present invention.

Tests performed using the fluid-flow contaminant indicator shown in FIG. 3 provide an indication of the advantages of the present invention. The tested contaminant indicator included a colorimetric indicator configured to detect concentrations of ammonium contained in a hydroxide solution. The ammonium hydroxide solution was bubbled with air of known bubble counts and the air flow containing ammonia vapor was passed through the fluid-How contaminant indicator system. The colorimetric indicator changed color from orange to blue due to increased pH level. The time elapsed to form blue color was recorded for the "Masked" indicator as noted in Table 1 below. The fluid-flow contaminant indicator was then modified to omit the mask. The exposure of the fluid-flow contaminant indicator to ammonia was then repeated as described above with the "No Mask" results also indicated in Table 1.

Following the change to the blue color on the indicators in each of the above-described Masked and No Mask examples, the two indicator systems were then flushed with atmospheric air of the same flow rate as in the tests above. In absence of ammonia in the flow, the carbon dioxide in the atmospheric air reacted with the ammonium hydroxide on the indicator thereby lowering the pH level and subsequently turning the blue color back to orange. The time elapsed to change the blue color back to orange was recorded (see Table 1). In both of the above examples, the Masked indicator greatly extended the useful life of the indicator.

TABLE 1

Elapsed time for color formation and color fading due to contaminant ammonia and interfering carbon dioxide, respectively.

| Colorimetric Indicator | Time Elapsed for Full Color Formation Due to Exposure to Vapors of 1% ammonium Hydroxide Solution | Time Elapsed for Total Fading Due to Exposure to Air |
| --- | --- | --- |
| Masked | 14 minutes | 4 hrs |
| No Mask | 32 seconds | 16 minutes |

Although the invention has been described relative to a specific embodiment thereof, there are numerous variations and modifications that will be readily apparent to those skilled in the art in light of the above teachings. For example, the masks of the present invention could be calibrated with time and/or concentration levels to provide quantitative information related to contaminant(s) of interest. It is therefore to be understood that, within the scope of the appended claims, the invention may be practiced other than as specifically described.

What is claimed as new and desired to be secured by Letters Patent of the United States is:

1. A fluid-flow contaminant indicator, comprising:
    a container having a fluid-flow path passing there through, said fluid-flow path having an upstream region and a downstream region;
    a colorimetric indicator disposed in said fluid-flow path, said colorimetric indicator having a surface adapted to change color when exposed to a contaminant of interest, said colorimetric indicator having at least one hole passing there through wherein said fluid-flow path extends through said at least one hole; and
    a fluid-impervious mask adhered to all of said surface except for a region of said surface adjacent to said at least one hole wherein, when the contaminant is adapted to be in said fluid-flow path, only said region of said surface is directly exposed to the contaminant in said fluid-flow path for providing an instantaneous indication of exposure to the contaminant, and wherein a remainder of said surface that excludes said region is exposed to the contaminant via absorption thereof from said region for providing a time-lapse indication of exposure to the contaminant.

2. A fluid-flow contaminant indicator as in claim 1, wherein said region of said surface circumscribes said at least one hole.

3. A fluid-flow contaminant indicator as in claim 1, wherein said mask comprises a material selected from the group consisting of transparent materials and translucent materials.

4. A fluid-flow contaminant indicator as in claim 1, wherein at least a portion of said container in line of sight with said region of said surface comprises a material selected from the group consisting of transparent materials and translucent materials.

5. A fluid-flow contaminant indicator as in claim 1, wherein said mask comprises a material selected from the group consisting of transparent materials and translucent materials, and wherein at least a portion of said container in line of sight with said mask and said region of said surface comprises a material selected from the group consisting of transparent materials and translucent materials.

6. A fluid-flow contaminant indicator as in claim 1, wherein said surface of said colorimetric indicator comprises a curved surface.

7. A fluid-flow contaminant indicator as in claim 1, wherein said surface of said colorimetric indicator comprises a planar surface.

8. A fluid-flow contaminant indicator as in claim 1, further comprising sorbent material for absorbing the contaminant of interest, said sorbent material disposed in said fluid-flow path between said colorimetric indicator and said downstream region of said fluid-flow path.

9. A fluid-flow contaminant indicator, comprising:
a container having a fluid-flow path passing there through, said fluid-flow path having an upstream region and a downstream region;
a colorimetric indicator disposed in said fluid-flow path, said colorimetric indicator having a surface adapted to change color when exposed to a contaminant of interest, said colorimetric indicator having a hole passing there through wherein said fluid-flow path extends through said hole;
a fluid-impervious and transparent mask adhered to all of said surface except for a region of said surface adjacent to said hole wherein said region of said surface faces said upstream region of said fluid-flow path and wherein, when the contaminant is adapted to be in said fluid-flow path, only said region of said surface is directly exposed to the contaminant in said fluid-flow path for providing an instantaneous indication of exposure to the contaminant, wherein a remainder of said surface that excludes said region is exposed to the contaminant via absorption thereof from said region for providing a time-lapse indication of exposure to the contaminant; and
at least a portion of said container in line of sight with said mask and said region of said surface comprising a material selected from the group consisting of transparent materials and translucent materials.

10. A fluid-flow contaminant indicator as in claim 9, wherein said region of said surface circumscribes said hole.

11. A fluid-flow contaminant indicator as in claim 9, wherein said surface of said colorimetric indicator comprises a curved surface.

12. A fluid-flow contaminant indicator as in claim 9, wherein said surface of said colorimetric indicator comprises a planar surface.

13. A fluid-flow contaminant indicator as in claim 9, further comprising sorbent material for absorbing the contaminant of interest, said sorbent material disposed in said fluid-flow path between said colorimetric indicator and said downstream region of said fluid-flow path.

14. A fluid-flow contaminant indicator, comprising:
a container having a fluid-flow path passing there through, said fluid-flow path having an upstream region and a downstream region, said fluid-flow path adapted to transport a fluid from said upstream region to said downstream region;
a colorimetric indicator disposed in said fluid-flow path, said colorimetric indicator having a surface adapted to change color when exposed to a contaminant of interest contained in the fluid, said colorimetric indicator having a hole passing there through wherein said fluid-flow path extends through said hole; and
a fluid-impervious and transparent mask adhered to all of said surface except for a region of said surface adjacent to said hole, wherein said colorimetric indicator and said mask are disposed in said fluid-flow path such that said region of said surface is exposed to the fluid from said upstream region of said fluid-flow path prior to the fluid passing through said hole and wherein, when the contaminant is adapted to be in said fluid-flow path, only said region of said surface is directly exposed to the contaminant in said fluid-flow path for providing an instantaneous indication of exposure to the contaminant, and wherein a remainder of said surface that excludes said region is exposed to the contaminant via absorption thereof from said region for providing a time-lapse indication of exposure to the contaminant.

15. A fluid-flow contaminant indicator as in claim 14, wherein said region of said surface circumscribes said hole.

16. A fluid-flow contaminant indicator as in claim 14, wherein at least a portion of said container in line of sight with said mask and said region of said surface comprises a material selected from the group consisting of transparent materials and translucent materials.

17. A fluid-flow contaminant indicator as in claim 14, wherein said surface of said colorimetric indicator comprises a curved surface.

18. A fluid-flow contaminant indicator as in claim 14, wherein said surface of said colorimetric indicator comprises a planar surface.

19. A fluid-flow contaminant indicator as in claim 14, further comprising sorbent material for absorbing the contaminant of interest, said sorbent material disposed in said fluid-flow path between said colorimetric indicator and said downstream region of said fluid-flow path.

* * * * *